United States Patent
Zeng et al.

(10) Patent No.: US 11,621,534 B2
(45) Date of Patent: Apr. 4, 2023

(54) LASER GAIN OPTICAL FIBER HEAT-DISSIPATING DEVICE

(71) Applicants: Chongqing Institute of East China Normal University, Chongqing (CN); ROI Optoelectronics Technology CO, LTD., Shanghai (CN); East China Normal University, Shanghai (CN)

(72) Inventors: Heping Zeng, Chongqing (CN); Qingshan Zhang, Chongqing (CN); Mengyun Hu, Chongqing (CN); Shuai Xu, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 212 days.

(21) Appl. No.: 17/144,327

(22) Filed: Jan. 8, 2021

(65) Prior Publication Data
US 2021/0218216 A1    Jul. 15, 2021

(30) Foreign Application Priority Data
Jan. 10, 2020 (CN) .................. CN202010024091

(51) Int. Cl.
*H01S 3/04*    (2006.01)
*H01S 3/067*   (2006.01)
*H01S 3/042*   (2006.01)

(52) U.S. Cl.
CPC ........ *H01S 3/0407* (2013.01); *H01S 3/06704* (2013.01); *H01S 3/042* (2013.01)

(58) Field of Classification Search
CPC .... H01S 3/06704; H01S 3/0407; H01S 3/042; H01S 3/0404; H01S 3/067–06795;
(Continued)

(56) References Cited

U.S. PATENT DOCUMENTS 3,666,949 A * 5/1972 De Falco ............... G01J 5/08
                                                    385/115
4,572,609 A * 2/1986 Sakuragi ............. G02B 6/4439
                                                    385/123
(Continued)

FOREIGN PATENT DOCUMENTS

CN      203616507 U * 5/2014
CN      105490141 A * 4/2016
(Continued)

OTHER PUBLICATIONS

SIPO, Notice of the First Examination Opinion for CN Application No. 202010024091.8, dated Dec. 16, 2020.

*Primary Examiner* — Joshua King
(74) *Attorney, Agent, or Firm* — Hodgson Russ LLP

(57) ABSTRACT

The present disclosure relates to a gain optical fiber heat-dissipating device for high power ultra-fast laser, including a gain optical fiber and a heat-dissipating structure. The heat-dissipating structure includes a metal tube, a flexible heat-conducting layer and a water-cooling structure. The gain optical fiber is passed through the metal tube, and the flexible heat-conducting layer is provided between the metal tube and the gain optical fiber. The water-cooling structure is provided on the metal tube to reduce temperature of the gain optical fiber. The gain optical fiber heat-dissipating device according to the present disclosure can dissipate the heat through a water-cooling mode, and realize rapid heat dissipation, thus improving heat-dissipating efficiency.

14 Claims, 4 Drawing Sheets

(58) Field of Classification Search
CPC .............. G02B 6/4268; G02B 6/3814; G02B 6/02–0288; G02B 6/032–03694; G02B 6/241; G02B 6/22
See application file for complete search history.

(56) References Cited

U.S. PATENT DOCUMENTS

| | | | | |
|---|---|---|---|---|
| 5,107,513 | A * | 4/1992 | Sagie | H01S 3/042 372/35 |
| 5,991,315 | A * | 11/1999 | Injeyan | H01S 3/113 372/71 |
| 6,104,853 | A * | 8/2000 | Miyagi | A61B 18/22 385/125 |
| 6,167,177 | A * | 12/2000 | Sandstrom | G02B 6/14 385/100 |
| 8,355,608 | B2 * | 1/2013 | Hu | G02B 6/264 385/27 |
| 2005/0220429 | A1 | 10/2005 | Davis | H01S 3/042 385/125 |
| 2008/0161890 | A1* | 7/2008 | Lafontaine | A61B 18/1492 606/41 |
| 2011/0069376 | A1* | 3/2011 | Diening | H01S 3/06758 359/341.1 |
| 2012/0085518 | A1* | 4/2012 | Ichkahn | H01S 3/042 165/104.26 |
| 2013/0250984 | A1* | 9/2013 | Xuan | H01S 3/0625 372/34 |
| 2014/0050448 | A1* | 2/2014 | Konishi | G02B 6/4401 385/100 |
| 2014/0205252 | A1* | 7/2014 | Tafoya | G02B 6/4296 385/123 |
| 2014/0270668 | A1* | 9/2014 | Mermelstein | G02B 6/3814 385/123 |
| 2016/0072248 | A1* | 3/2016 | Johnson | G02B 6/4457 385/135 |
| 2016/0285226 | A1* | 9/2016 | Krause | H01S 5/405 |
| 2020/0326493 | A1* | 10/2020 | Zhang | G02B 6/36 |

FOREIGN PATENT DOCUMENTS

| | | | | |
|---|---|---|---|---|
| CN | 105492943 A | * | 4/2016 | ............ H01S 3/005 |
| CN | 107017546 | | 8/2017 | |
| CN | 107017546 A | * | 8/2017 | |
| CN | 107123922 A | * | 9/2017 | |
| CN | 107332100 A | * | 11/2017 | ........... H01S 3/0407 |
| CN | 206696476 | | 12/2017 | |
| CN | 206696476 U | * | 12/2017 | |
| CN | 105826802 B | * | 8/2018 | ......... H01S 3/06708 |
| CN | 109839016 A | * | 6/2019 | ............ F28D 7/103 |
| DE | 4239829 A1 | * | 6/1993 | ............ A61C 1/0046 |
| DE | 102011117509 A1 | * | 5/2012 | ........... A61B 18/201 |
| FR | 3030785 A1 | * | 6/2016 | ........... G02B 6/4296 |
| JP | 2004054205 A | * | 2/2004 | ............ B29C 48/05 |
| WO | WO-9714983 A1 | * | 4/1997 | ........... G02B 6/0218 |

* cited by examiner

LASER GAIN OPTICAL FIBER HEAT-DISSIPATING DEVICE

CROSS-REFERENCE TO RELATED APPLICATION

This application claims priority to Chinese Patent Application No. 202010024091.8, filed Jan. 10, 2020, the entire disclosure of which is incorporated herein by reference.

FIELD

The present disclosure relates to a field of optical fiber heat dissipation technologies, and more particularly to a laser gain optical fiber heat-dissipating device.

BACKGROUND

In recent years, with the development of optical fiber technology, output energy and power of optical fiber lasers have been greatly promoted, and the optical fiber lasers have been increasingly applied in the fields of scientific research and industrial production. Compared with traditional solid-state lasers, optical fiber lasers have advantages of simple structure, easy set-up, high pump conversion efficiency, good beam mode, low price and so on. At the same time, the optical fiber has a very high surface-to-volume ratio, and can realize rapid heat transfer through air-cooling and water-cooling, thus maintaining the normal operation of the laser. However, when the power of laser is further increased, the capacity of air-cooled heat dissipation is difficult to meet the demand. At this time, the active water-cooled heat dissipation is usually introduced, and the optical fiber is placed on a water-cooling plate to achieve transfer of the excess heat. In the related art, a V-shaped groove is usually carved in the water-cooling plate for placement of the optical fiber. The main disadvantages of this method are: the optical fiber can be squeezed by external force when fixed, which increases the wastage or irreversible damage risk of the optical fiber; the optical fiber usually has a cylindrical shape, and has a small contact area with the water-cooling plate, thus the heat-dissipating efficiency is low, and the heat-dissipating effect is greatly affected; at the same time, the water-cooling plate has a large volume, which is not convenient for equipment integration and installation; in addition, when the gain optical fiber is in high power amplification, the heat is accumulated excessively, and the natural heat dissipation cannot guarantee the performance of the gain optical fiber.

SUMMARY

The present disclosure provides a gain optical fiber heat-dissipating device including a gain optical fiber and a heat-dissipating structure. The heat-dissipating structure includes a metal tube, a flexible heat-conducting layer and a water-cooling structure. The gain optical fiber is passed through the metal tube, the flexible heat-conducting layer is provided between the metal tube and the gain optical fiber, and the water-cooling structure being provided on the metal tube to reduce temperature of the gain optical fiber.

DETAILED DESCRIPTION

Specific embodiments of the present disclosure will be further explained in combination with the drawings.

Embodiment I

Figure 1:
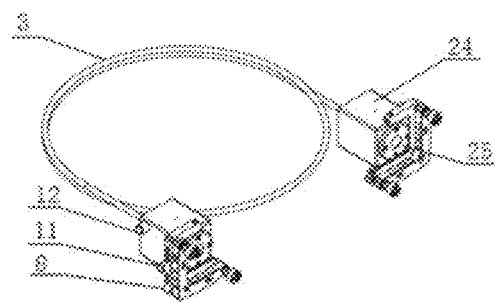
FIG. 1 is a schematic view of a gain optical fiber heat-dissipating device provided by a first embodiment of the present disclosure.

Referring to FIG. 1, a gain finer heat-dissipating device is disclosed in this embodiment, including a gain optical fiber 1 and a heat-dissipating structure. The heat-dissipating structure includes a metal tube 3, a flexible heat-conducting layer and a water-cooling structure. The gain optical fiber 1 is passed through the metal tube 3, and the flexible heat-conducting layer is arranged between the metal tube 3 and the gain optical fiber 1. The water-cooling structure is arranged on the metal tube 3 to reduce temperature of the gain optical fiber 1. A gap between the optical fiber and the metal tube 3 is filled with the flexible heat-conducting layer, such that heat generated by the gain optical fiber 1 can be quickly transferred to an outer wall of the metal tube 3 and taken away timely by the water-cooling structure, thus ensuring normal operation of the gain optical fiber; the heat generated by the gain optical fiber 1 can be dissipated quickly and efficiently through the metal tube 3 and the flexible heat-conducting layer to prevent the device from being affected or damaged by high temperature; the flexible heat-conducting not only reduces interface thermal resistance between the gain optical fiber 1 and the metal tube 3, but also avoids increased wastage or irreversible damage of the gain optical fiber 1 due to squeezing.

In this embodiment, the flexible heat-conducting layer is made of a flexible thermal phase change material or a flexible heat-conducting material. The flexible heat-conducting material is non-silicon highly heat-conducting silicone grease or soft heat-conducting silicone or other heat-conducting materials. The flexible thermal phase change material generates a phase change when heated to transmit the heat to the water-cooling structure quickly. A pasty or flexible heat-conducting material has a high heat conductivity, rheology and phase separation cannot occur when heated, the heat-conducting material is in sufficient contact with the gain optical fiber and an inner wall of the metal tube 3.

In this embodiment, a material of the metal tube 3 is copper, in other embodiments, the material of the metal tube can also be iron or steel or other metals, which is not limited thereto.

Referring to FIGS. 2 to 8, the water-cooling structure includes a water-cooling end socket 24 and a fiber optic terminal 4, and the fiber optic terminal is made of a metal material. The water-cooling end socket 24 has a sealing chamber for containing circulating cooling water and cooling the fiber optic terminal 4, and the sealing chamber is provided with a first inlet 11 and a first outlet 12. The fiber optic terminal 4 is mounted on the water-cooling end socket 24 and passes through the sealing chamber. At least one of two ends of the gain optical fiber 1 is provided with the fiber optic terminal 4, and two ends of the gain optical fiber 1 extend to an outside of the metal tube 3. An end of metal tube 3 and an end of the gain optical fiber 1 adjacent on an identical side are both provided in the fiber optic terminal 4, and a sealant is provided between the metal tube 3 and the fiber optic terminal 4 and between the gain optical fiber 1 and the fiber optic terminal 4. The gain optical fiber 1 transmits and receives signals externally through the fiber optic terminal 4. The sealant provided between the gain optical fiber 1 and the fiber optic terminal 4 is a heat-conducting sealant. The fiber optic terminal 4 can be made of copper material, and in other embodiments, can be also made of other metal material, which is not limited thereto.

In this embodiment, two ends of the gain optical fiber 1 are each provided with the fiber optic terminal 4, and two ends of the metal tube 3 and two ends of the gain optical fiber 1 are each provided in the corresponding fiber optic terminal 4.

Figure 2:
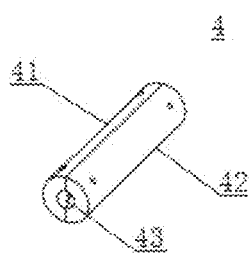
FIG. 2 is a schematic view of a fiber optic terminal provided by a first embodiment of the present disclosure.
Figure 3:
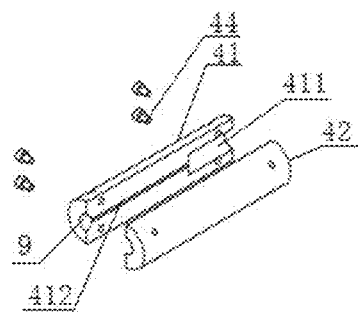
FIG. 3 is an assembly view of a fiber optic terminal provided by a first embodiment of the present disclosure.
Figure 4:
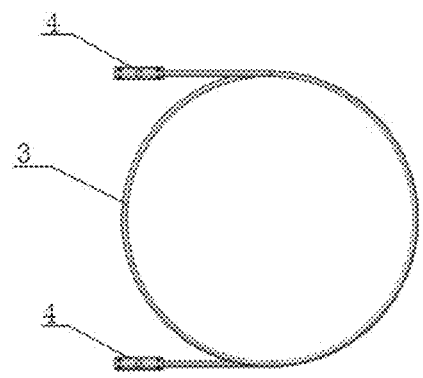
FIG. 4 is a schematic view of a fiber optic terminal for connecting a gain optical fiber and a metal tube provided by a first embodiment of the present disclosure.
Figure 5:
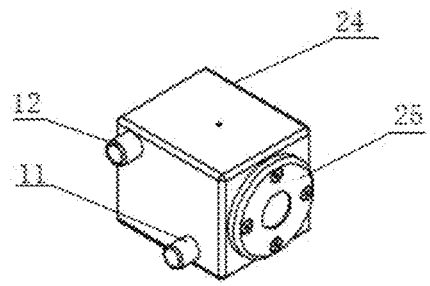
FIG. 5 is a schematic view of a water-cooling end socket provided by a first embodiment of the present disclosure.
Figure 6:
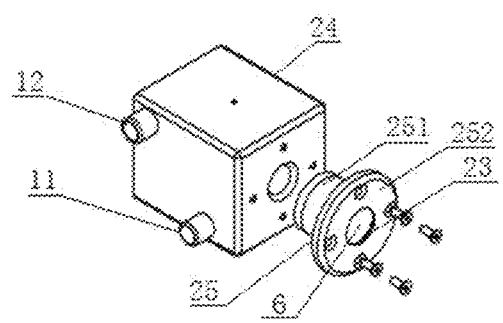
FIG. 6 is an assembly view of the water-cooling end socket in FIG. 5.
Figure 7:
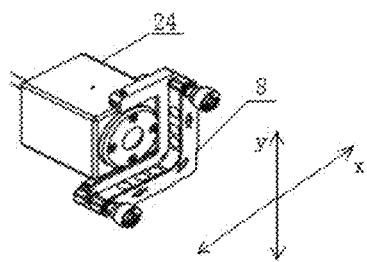
FIG. 7 is a schematic view of connection between a water-cooling end socket and a two-dimensional adjusting frame provided by a first embodiment of the present disclosure.
Figure 8:
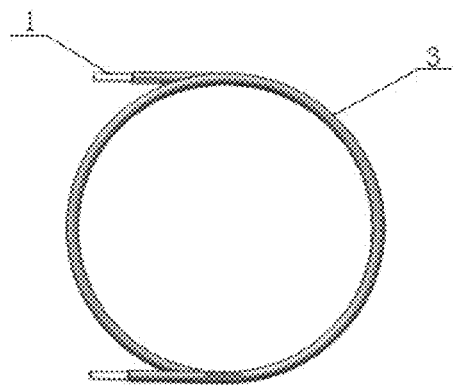
FIG. 8 is a schematic view of connection between a gain optical fiber and a metal tube provided by a first embodiment of the present disclosure.

Referring to FIGS. 2 and 3, the fiber optic terminal 4 is formed by combining a first clamping member 41 and a second clamping member 42. A first end of the first clamping member 41 is provided with a first mounting groove 411, and the first clamping member 41 is provided with a first clamping recess 412 communicating the first mounting groove 411 with a second end of the first clamping member 41 opposite the first end. The second clamping member 42 is provided with a second mounting groove corresponding to the first mounting groove 411 and a second clamping recess corresponding to the first clamping recess 412. The first mounting groove 411 and the second mounting groove, and the first clamping recess 412 and the second clamping recess cooperatively enclose and define a clamping channel 43. The first mounting groove 411 and the second mounting groove are used for assembling an end of the metal tube 3, and the first clamping recess 412 and the second clamping recess are used for clamping an end of the gain optical fiber 1.

The first clamping member 41 and the second clamping member 42 are fixed together by a bolt 44. The first clamping member 41 and the second clamping member 42 enclose and clamp the gain optical fiber 1 and are fastened by a bolt, a gas-tightness between the metal tube 3 and the gain optical fiber 1 is ensured by using a sealant between the first clamping member 41, the second clamping member 42 and the gain optical fiber 1, thus prevent the gain optical fiber 1 from being in contact with water. The heat-conducting sealant is used between the first clamping member 41, the second clamping member 42 and the gain optical fiber 1, such that heat of an end of the gain optical fiber 1 is transmitted to the fiber optic terminal 4 through the heat-conducting sealant. The fiber optic terminal 4 dissipates the heat through water cooling. The other end of the fiber optic terminal 4 is fitted tightly with the metal tube through the first mounting groove 411 and the second mounting groove, and the gas-tightness is ensured by the sealant.

In this embodiment, the first clamping member 41 and the second clamping member 42 are both semi-cylinders, and a cylinder is formed by combining the first clamping member 41 and the second clamping member 42. The first mounting groove 411 and the second mounting groove are both semi-cylindrical grooves, and a cylindrical hole formed by the first mounting groove 411 and the second mounting groove is fitted tightly with the metal tube for effective assembly of the metal tube. The first clamping recess 412 and the second clamping recess are both semi-cylindrical recesses, and a size of the first clamping recess 412 and the second clamping recess that are joined together is suitable for an outer diameter of the gain optical fiber 1 for effective assembly of the gain optical fiber 1.

In this embodiment, outer ends of the first clamping recess 412 and the second clamping recess are each formed a conical recess 9 with an angle gradually increasing from inside to outside. The outer ends of the first clamping recess 412 and the second clamping recess are designed with the conical recesses 9 to facilitate clamping and coupling of the gain optical fiber.

In this embodiment, the water-cooling structure also includes a window assembly 25, the window assembly 25 includes a column 251 fitted with the water-cooling end socket 24 in an interference fit, a connecting disc 252 arranged on the column 251 and a window body 6 for isolating ambient air. The column 251 is inserted into the water-cooling end socket 24 until the connecting disc 252 abuts against an outer side of the water-cooling end socket 24 and is fixed on the water-cooling end socket 24 by a screw. The column 251 is provided with an optical output channel 23 along its axial direction, and an outer end of the fiber optic terminal 4 is fitted in the optical output channel 23. The window body 6 is provided in the optical output channel 23 and provided at an outer side of the outer end of the fiber optic terminal 4. The window assembly 25 also includes a sealing ring arranged between the connecting disc 252 and the water-cooling end socket 24. A film layer beneficial to a wave band of a signal light generated by the gain optical fiber 1 is plated on the window body 6. The window body 6 is used for protecting an end face of the gain optical fiber, preventing dust in the air from contacting with the end face of the gain optical fiber 1. A sealant is provided between the window assembly 25 and the fiber optic terminal 4 to prevent cooling water in the water-cooling end socket 24 from affecting the gain optical fiber 1 through a gap between the window assembly 25 and the fiber optic terminal 4. An outer end of the fiber optic terminal 4 is fitted with the optical output channel 23 in an interference fit.

In this embodiment, the water-cooling end socket 24 is made of metal material, an inner end of the fiber optic terminal 4 is passed through the water-cooling end socket and fitted with the water-cooling end socket in an interference fit, a high heat-conducting material is provided between the fiber optic terminal 4 and the water-cooling end socket 24. The high heat-conducting material is indium foil, and in other embodiments, can also be other high heat-conducting materials, which is not limited thereto. A plurality of water cooling channels is provided in the water-cooling end socket 24, increasing a contacting face of the water and the metal. The water-cooling end socket 24 is tightly joined with the fiber optic terminal, and the high heat-conducting material is filled into the contacting face to facilitate heat transfer.

In this embodiment, the water-cooling end socket 24 can be made of copper material, and in other embodiments, the water-cooling end socket 24 can also be made of other metal materials, which is not limited thereto.

Figure 11:
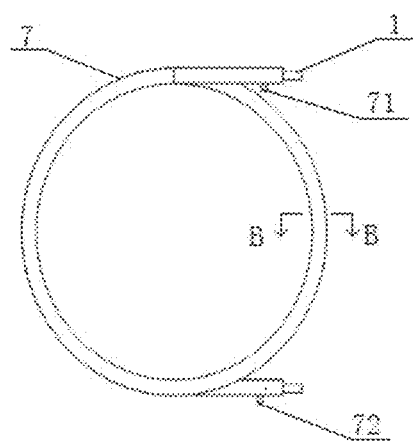
FIG. 11 is a schematic view of connection between a gain optical fiber, a metal tube and a water jacket provided by a third embodiment of the present disclosure.
Figure 12:
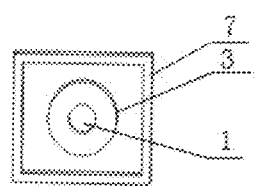
FIG. 12 is a cross sectional view taken along a line B-B in FIG. 11.

Referring to FIGS. 11 and 12, the water-cooling structure includes a water jacket 7 fitted over the metal tube 3 for containing circulating cooling water and cooling the metal tube 3, and the water jacket 7 is provided with a third inlet 71 and a third outlet 72.

In this embodiment, the third inlet 71 and the third outlet 72 are provided on two ends of the water jacket along an axial direction of the metal tube 3. The third inlet 71 and the third outlet 72 provided on two ends of the water jacket lengthen a circulating path of the cooling water in the water jacket, and accelerates heat-dissipation of the metal tube.

Figure 9:
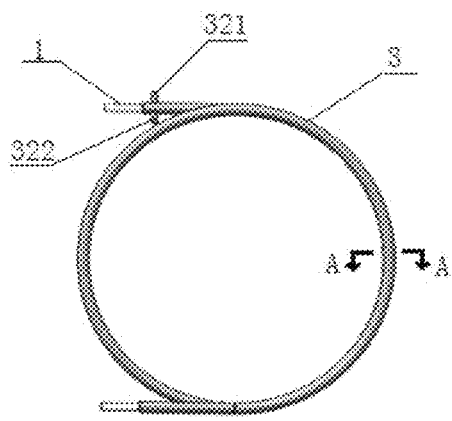
FIG. 9 is a schematic view of connection between a gain optical fiber and a metal tube provided by a second embodiment of the present disclosure.
Figure 10:
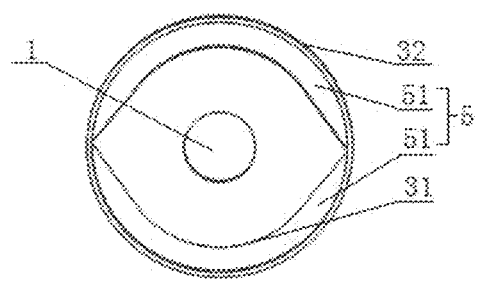
FIG. 10 is a cross sectional view taken along a line A-A in FIG. 9.

Referring to FIGS. 9 and 10, a tube wall of the metal tube 3 has a two-layer structure and includes an inner-layer tube wall 31 and an outer-layer tube wall 32. The water-cooling structure includes a circulating water channel 5 defined between the inner-layer tube wall 31 and the outer-layer tube wall 32 for containing circulating cooling water and a second inlet 321 and a second outlet 322 that are in communication with the circulating water channel 5. The second inlet 321 and the second outlet 322 are provided on the outer-layer tube wall 32.

In this embodiment, the circulating water channel 5 includes two sub-circulating water channels 51 in communication with each other. An end of the outer-layer tube wall 32 is provided with a second inlet 321 in communication with one of the sub-circulating water channels 51 and a second outlet 322 in communication with the other of the sub-circulating water channels 51, and two sub-circulating water channels 51 are communicated at the other end of the outer-layer tube wall 32. A position where the second inlet 321 and the second outlet 322 are provided is arranged opposite a position where the two sub-circulation water channels 51 are communicated, such that a circulating path of the cooling water in the circulation water channel 5 can be lengthened, and heat-dissipation of the metal tube can be accelerated.

In this embodiment, the gain optical fiber heat-dissipation device also includes a two-dimensional adjusting frame 8 for adjusting offset of the water-cooling end socket 24 along an X-axis direction or a Y-axis direction, and the water-cooling end socket 24 is mounted on the two-dimensional adjusting frame 8. An adjustment in XY two dimensional directions of the optical fiber can be realized by the two-dimensional adjusting frame to facilitate optical path coupling, and thus an assembly difficulty of a laser can be reduced. It is convenient for spatial optical path coupling of module by adjusting a direction of the optical fiber and greatly improves the ease of use and the degree of freedom of the module. The two-dimensional adjusting frame is high precision square two-dimensional adjusting frame, and adjusts a direction of the end face of the gain optical fiber to facilitate spatial coupling of the laser.

According to this embodiment, the heat generated by the gain optical fiber can be quickly transmitted to the outer wall of the metal tube by filling the flexible heat-conducting layer into the gap between the optical fiber and the metal tube, the heat from the metal tube 3 can be transmitted to the fiber optic terminal 4 by providing the fiber optic terminals 4 and the water-cooling end sockets 24 at two ends of the metal tube 3, and the heat can be taken away timely by the circulating water within the sealing chamber of the water-cooling end socket 24, thus ensuring normal operation of the gain optical fiber.

Embodiment II

The second embodiment differs from the first embodiment in that the water-cooling structure is different. Referring to FIGS. 9 and 10, a tube wall of the metal tube 3 has a two-layer structure, including an inner-layer tube wall 31 and an outer-layer tube wall 32. The water-cooling structure includes a circulating water channel 5 defined between the inner-layer tube wall 31 and the outer-layer tube wall 32 for containing circulating cooling water and a second inlet 321 and a second outlet 322 that are in communication with the circulating water channel 5. The second inlet 321 and the second outlet 322 are provided on the outer-layer tube wall 32.

In this embodiment, the circulating water channel 5 includes two sub-circulating water channels 51 in communication with each other. The second inlet 321 and the second outlet 322 are provided at an end of the outer-layer tube wall 32, the second inlet 321 is in communication with one of the sub-circulating water channels 51, and the second outlet 322 is in communication with the other of the sub-circulating water channels 51. The two sub-circulating water channels 51 are communicated at the other end of the outer-layer tube wall 32. A position where the second inlet 321 and the second outlet 322 are provided is arranged opposite a position wherein the two sub-circulation water channels 51 are communicated, such that a circulating path of the cooling water in the circulation water channel 5 can be lengthened, and heat-dissipation of the metal tube can be accelerated.

According to this embodiment, the heat generated by the gain optical fiber can be quickly transmitted to the outer wall of the metal tube by filling the flexible heat-conducting layer into the gap between the optical fiber and the metal tube, and the heat can be taken away timely by the circulating water within the circulating water channel 5 of the metal tube 3, thus ensuring normal operation of the gain optical fiber.

Embodiment III

The third embodiment differs from the second embodiment and the first embodiment in that the water-cooling structure is different. Referring to FIGS. 11 and 12, the water-cooling structure includes a water jacket 7 fitted over the metal tube 3 for containing circulating cooling water and cooling the metal tube 3, and the water jacket 7 is provided with a third inlet 71 and a third outlet 72.

In this embodiment, the third inlet 71 and the third outlet 72 are provided on two ends of the water jacket along an axial direction of the metal tube 3. The third inlet 71 and the third outlet 72 provided on two ends of the water jacket lengthen a circulating path of the cooling water in the water jacket, and accelerates heat-dissipation of the metal tube.

According to this embodiment, the heat generated by the gain optical fiber can be quickly transmitted to the outer wall of the metal tube by filling the flexible heat-conducting layer into the gap between the optical fiber and the metal tube, and the heat can be taken away timely by the circulating water within the water jacket 7 arranged outside the metal tube 3, thus ensuring normal operation of the gain optical fiber.

In the gain optical fiber heat-dissipating device according to the present disclosure, has a high integration, the heat-dissipating efficiency can be greatly improved, and the performance of the gain optical fiber can be ensured, the gain optical fiber is packaged within the metal tube, the heat tube technology is used to realize the rapid transfer of heat from the surface layer of the optical fiber to the water-cooling structure mounted on the metal tube, and the heat of heat-dissipating cooling end can be quickly taken away by water cooling, thus integration is high, the heat-dissipating efficiency is greatly improved, and the performance of the gain optical fiber is ensured. Since the flexible heat-dissipating layer is filled between the mental tube and the gain optical fiber, no external squeezing is directly applied to the gain optical fiber, the wastage and the damage of the gain optical fiber can be greatly reduced; at the same time the two-dimensional adjusting frame is added to the water-cooling structure, the degree of freedom of optical path is increased, coupling difficulty of spatial optical paths is reduced, it is convenient for spatial optical path coupling of module by adjusting a direction of the optical fiber, the ease of use and the degree of freedom of the module can be greatly improved, and it can more easily be fitted on the laser.

Preferred specific embodiments of the present disclosure have been described in detail above. It should be understood that many modifications and variations according to concept of the present disclosure can be made by a person having ordinary skill in the art without creative efforts. Therefore, any technical solutions that can be achieved by those skilled in the art by way of logical analysis, reasoning or limited experiments on the basis of the prior art and according to the concept of the present disclosure, shall fall within the scope of the claims of the present disclosure.

What is claimed is:

1. A gain optical fiber heat-dissipating device, comprising: a gain optical fiber; and a heat-dissipating structure comprising: a metal tube, the gain optical fiber being passed through the metal tube, a flexible heat-conducting layer provided between the metal tube and the gain optical fiber, and a water-cooling structure provided on the metal tube to reduce temperature of the gain optical fiber, wherein the water-cooling structure comprises a water-cooling end socket and a fiber optic terminal, the fiber optic terminal is made of a metal material, the water-cooling end socket has a sealing chamber configured to contain circulating cooling water and cool the fiber optic terminal, the sealing chamber is provided with a first inlet and a first outlet; the fiber optic terminal is mounted on the water-cooling end socket and passed through the sealing chamber, at least one of two ends of the gain optical fiber is provided with the fiber optic terminal, two ends of the gain optical fiber extend to an outside of the metal tube; an end of the metal tube and an end of the gain optical fiber adjacent on an identical side are both provided in the fiber optic terminal, a sealant is provided between the metal tube and the fiber optic terminal and between the gain optical fiber and the fiber optic terminal; and the gain optical fiber transmits or receives a signal externally through the fiber optic terminal.

2. The gain optical fiber heat-dissipating device according to claim 1, wherein two ends of the gain optical fiber are each provided with the fiber optic terminal, and two ends of the metal tube and two ends of the gain optical fiber are each provided in the corresponding fiber optic terminal.

3. The gain optical fiber heat-dissipating device according to claim 1, wherein the fiber optic terminal is formed by combining a first clamping member and a second clamping member; a first end of the first clamping member is provided with a first mounting groove, and the first clamping member is provided with a first clamping recess communicating the first mounting groove with a second end of the first clamping member opposite the first end; the second clamping member is provided with a second mounting groove corresponding to the first mounting groove and a second clamping recess corresponding to the first clamping recess; the first mounting groove and the second mounting groove, and the first clamping recess and the second clamping recess cooperatively enclose and define a clamping channel; the first mounting groove and the second mounting groove are configured to assemble an end of the metal tube, and the first clamping recess and the second clamping recess are configured to clamp an end of the gain optical fiber.

4. The gain optical fiber heat-dissipating device according to claim 3, wherein outer ends of the first clamping recess and the second clamping recess each define a conical recess with an angle gradually increasing from inside to outside.

5. The gain optical fiber heat-dissipating device according to claim 1, wherein the water-cooling structure further comprises a window assembly, the window assembly comprises a column fitted with the water-cooling end socket in an interference fit, a connecting disc arranged on the column and a window body configured to isolate ambient air; the column is inserted into the water-cooling end socket until the connecting disc abuts against an outer side of the water-cooling end socket and is fixed on the water-cooling end socket by a screw, the column is provided with an optical output channel along its axial direction, an outer end of the fiber optic terminal is fitted in the optical output channel, and the window body is provided in the optical output channel and at an outer side of the outer end of the fiber optic terminal.

6. The gain optical fiber heat-dissipating device according to claim 1, wherein the water-cooling end socket is made of a metal material, an inner end of the fiber optic terminal is passed through the water-cooling end socket and fitted with the water-cooling end socket in an interference fit, and a high heat-conducting material is provided between the fiber optic terminal and the water-cooling end socket.

7. The gain optical fiber heat-dissipating device according to claim 5, wherein the water-cooling end socket is made of a metal material, an inner end of the fiber optic terminal is passed through the water-cooling end socket and fitted with the water-cooling end socket in an interference fit, and a high heat-conducting material is provided between the fiber optic terminal and the water-cooling end socket.

8. The gain optical fiber heat-dissipating device according to claim 1, wherein the water-cooling structure comprises a water jacket fitted over the metal tube configured to contain circulating cooling water and cool the metal tube, the water jacket is provided with a third inlet and a third outlet; further, the third inlet and the third outlet are provided on two ends of the water jacket along an axial direction of the metal tube.

9. The gain optical fiber heat-dissipating device according to claim 1, wherein a tube wall of the metal tube has a two-layer structure and comprises an inner-layer tube wall and an outer-layer tube wall; the water-cooling structure comprises a circulating water channel defined between the inner-layer tube wall and the outer-layer tube wall configured to contain circulating cooling water and a second inlet and a second outlet in communication with the circulating water channel, the second inlet and the second outlet are provided on the outer-layer tube wall;

the circulating water channel comprises two sub-circulating water channels in communication with each other; the second inlet and the second outlet are provided at an end of the outer-layer tube wall, the second inlet is in communication with one of the sub-circulating water channels and the second outlet is in communication with the other of the sub-circulating water channels, and the two sub-circulating water channels are communicated at the other end of the outer-layer tube wall.

10. The gain optical fiber heat-dissipating device according to claim 1, further comprising a two-dimensional adjusting frame configured to adjust offset of the water-cooling end socket along an X-axis direction or a Y-axis direction, the water-cooling end socket being mounted on the two-dimensional adjusting frame.

11. The gain optical fiber heat-dissipating device according to claim 1, wherein a plurality of water cooling channels is provided in the water-cooling end socket.

12. The gain optical fiber heat-dissipating device according to claim 1, wherein the sealant provided between the gain optical fiber and the fiber optic terminal is a heat-conducting sealant.

13. The gain optical fiber heat-dissipating device according to claim 3, wherein the first clamping member and the second clamping member are fixed together by a bolt.

14. The gain optical fiber heat-dissipating device according to claim 3, wherein a sealant is provided between the first clamping member, the second clamping member and the gain optical fiber to ensure gas-tightness between the metal tube and the gain optical fiber.

* * * * *